United States Patent [19]

Shields, Jr.

[11] 4,090,712
[45] May 23, 1978

[54] ANIMATED GAME

[76] Inventor: James R. Shields, Jr., R.F.D. #4, Box 110, Canastota, N.Y. 13032

[21] Appl. No.: 800,159

[22] Filed: May 25, 1977

[51] Int. Cl.² .............................................. A63F 9/00
[52] U.S. Cl. .............................. 273/85 R; 273/101.2; 353/30
[58] Field of Search ............... 273/85 R, 101.1, 101.2, 273/1 E; 353/30, 37

[56] References Cited

U.S. PATENT DOCUMENTS

| 2,467,180 | 4/1949 | Anderson | 273/101.2 |
| 3,635,477 | 1/1972 | Ochi | 273/101.2 |
| 3,79 0,172 | 2/1974 | Nakamura | 273/101.2 |
| 3,809,395 | 5/1974 | Allison et al. | 273/1 E |

Primary Examiner—Anton O. Oechsle

Attorney, Agent, or Firm—Charles S. McGuire

[57] ABSTRACT

An animated game in which opposing players manipulate the respective positions on a viewing surface of a pair of images projected thereon by still projectors. Besides controlling the position of one of the images, each player also selects which of a plurality of images under his control is projected on the viewing surface at any given time. Scoring is provided by circuitry actuated in response to the relative positions of the two images and the particular images selected for projection at a given time. In its disclosed form, the invention employs a plurality of still projectors in two sets, the images from which may be selectively positioned by movement of handles connected to mirrors. Switch means for selection of the image which is projected are incorporated in the handles manipulated by each player.

12 Claims, 15 Drawing Figures

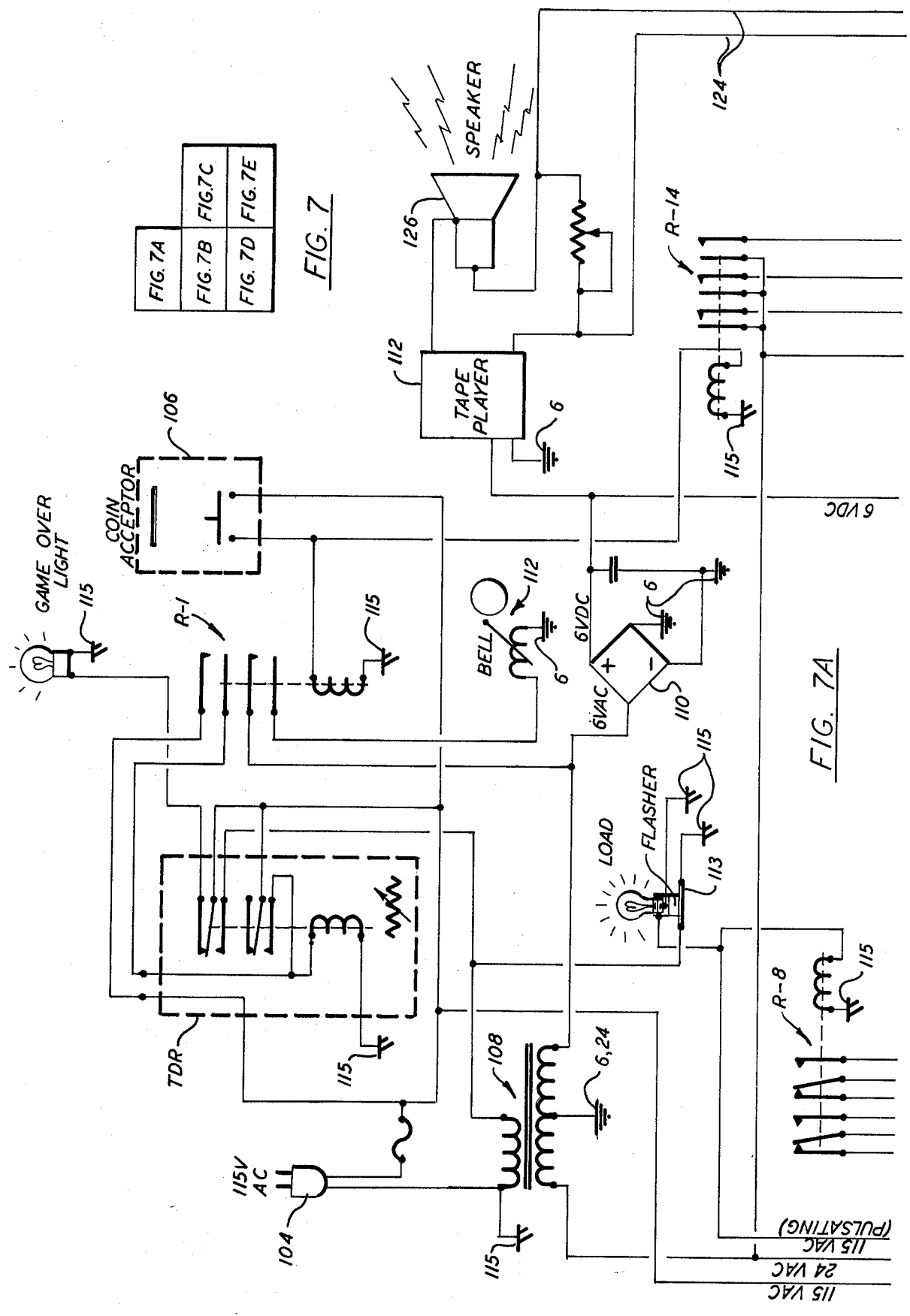

ANIMATED GAME

BACKGROUND OF THE INVENTION

The present invention relates to games or amusement devices and, more particularly, to animated games involving manipulation of projected images.

Amusement devices currently in widespread use include those wherein a player or operator manually controls the position of an image on a viewing surface. Most commonly, the image is presented on a cathode ray tube employing video circuits and electronic controls. In order to be economically feasible such game devices or relatively high technical sophistication must be produced in large quantities since they commonly require designing and producing customized integrated circuitry.

In addition to high initial costs which must be amortized over a large number of units, such devices require highly skilled personnel for any necessary repairs or maintenance. Furthermore, while certain images which move upon the CRT screen may be in the form of actual objects, these are not normally under selective positional control by the player or operator. Only images in the form of lines or dots can conveniently be placed under selective control.

One of the objects of the present invention is to provide a game wherein realistic images of persons, objects, etc., are projected on a viewing surface, the position of the images(s) upon the surface being controlled by the player(s) and scoring of the game being related to such position.

Another object is to provide a coin operated game involving the projection of photographic images and the manipulation of the position of such images on a viewing surface by one or more players.

A further object is to provide a game of a relatively high degree of technical sophistication which is economical to manufacture in small as well as large quantities and which is relatively simple to repair and maintain.

A still further object is to provide an adversary game in which two players individually control both the position upon a viewing surface of respective visual images and the type of image projected, scoring of the game being controlled by a combination of position and type of image.

In a more general sense, the object of the invention is to provide a novel and interesting game involving optical image projection and electrical actuation.

SUMMARY OF THE INVENTION

In accordance with the foregoing objects the disclosed form of the invention includes two sets of still projectors, each arranged to project an image on a single viewing surface. Appropriate electrical circuitry provides for actuation of only one projector from each set while the game is in progress. Each projector contains a different image, certain ones of which may be alternately projected by automatic means and others of which are selectively projected by operator actuation of switch means. A movable mirror, also under operator control, is provided in the projection path of each image so that the position thereof on the viewing surface is a function of mirror position. Electrical scoring means are functionally related both to the images selected by the two operators and the relative positions thereof on the viewing surface, also as determined by the operators.

The invention is shown and described in the context of a boxing game with images of two fighters being projected on a viewing screen from conventional slide projectors. A total of five projectors are provided for each fighter, the slides contained therein showing the fighters in five different positions. Two of the slides of each set show the fighters in two slightly different defensive stances, one of each set shows the fighters throwing a right punch, one a left punch, and the other a knock down position.

The images from the projectors are reflected to the viewing surface from mirrors which are movable by the operators. Two movable mirrors are provided, one for control by each operator to selectively position and move the image of his respective fighter on the viewing surface. The mirrors are manipulated by handles attached thereto and manually operable switch means for actuation of the projectors showing the fighters throwing right and left punches are incorporated in the handles.

A set of electrical contacts are affixed to each of the movable elements associated with the two handles, whereby the images on the viewing surface and the electrical contacts are in a predetermined positioned relationship. That is, one of the contacts of each set are in engagement when the mirrors are so positioned that the images of the respective fighters' gloves will make visual contact with the other fighter's head when a left or right punch is thrown. The circuitry is adapted to actuate a scoring relay when an operator actuates the switch on his handle which selects an image wherein his fighter is throwing a punch which makes contact with the opposing fighter's head, thereby scoring a hit. After a predetermined number of hits are scored by one fighter, the scoring relay is advanced to complete a circuit which actuates the projector having the slide showing the other fighter in the knock down position and locking out the other projectors. After a predetermined time delay the scoring relay is reset and the game is resumed. Play continues either until a predetermined number of knock downs are scored by one fighter, thereby scoring a knock out, or until expiration of a present time period.

The foregoing summary describes the invention in the specific context chosen for illustration and detailed description hereinafter. It is to be understood that many modifications, some of which are specifically mentioned, are contemplated within the general scope of the invention.

BRIEF DESCRIPTION OF THE DRAWINGS

FIG. 7 is a key to the orientation of the sheets bearing FIGS. 7A–7E; and

FIGS. 7A–7E constitute a single schematic diagram showing the electrical operation of the apparatus.

DETAILED DESCRIPTION

Figure 1:
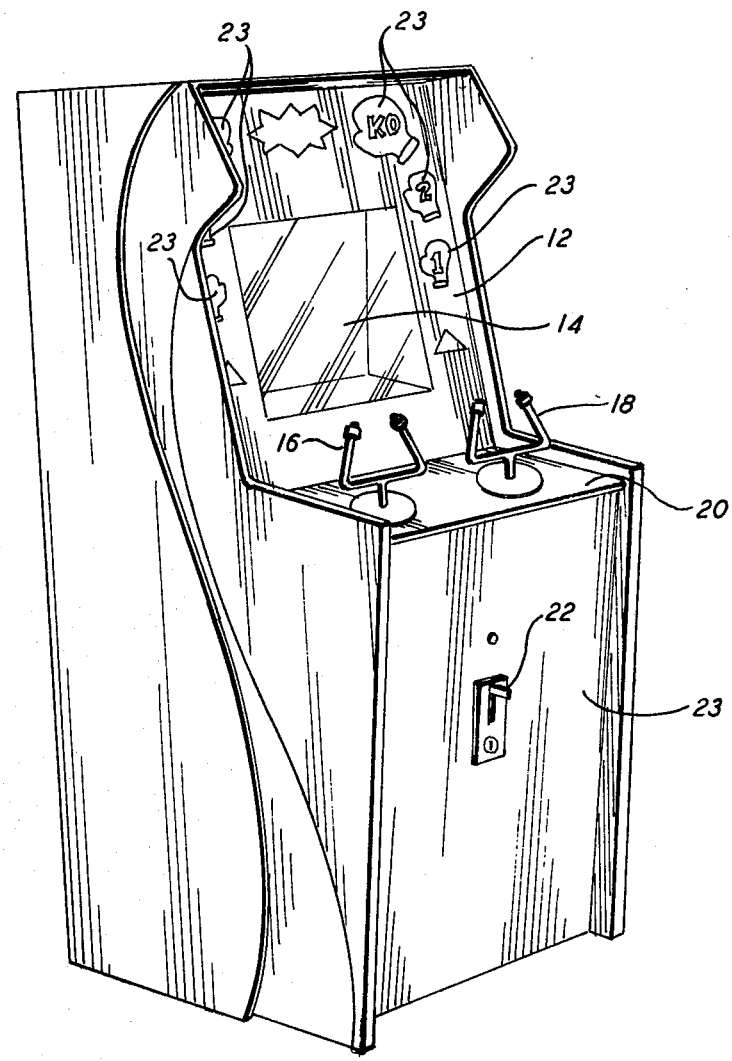
FIG. 1 is a perspective view of game apparatus incorporating the invention.

Referring now to the drawings, the game apparatus of the invention is embodied in a coin operated amusement device of the type commonly found in amusement arcades, and the like. The amusement device, generally denoted by reference numeral 10, is enclosed in an appropriate cabinet of optional design which incorporates in upper front wall 12 a translucent or transparent sheet 14 upon which a visual display is presented by rear projection, or through which such a display is viewed. A pair of generally U-shaped handles 16 and 18 extend upwardly through openings in another wall portion 20. Coin drop slot 22 is provided in a convenient location on lower front wall 23 for initial actuation of the device, as explained later. Scoring display means 23, also of entirely optional design, are incorporated in front wall 12.

Figure 2:
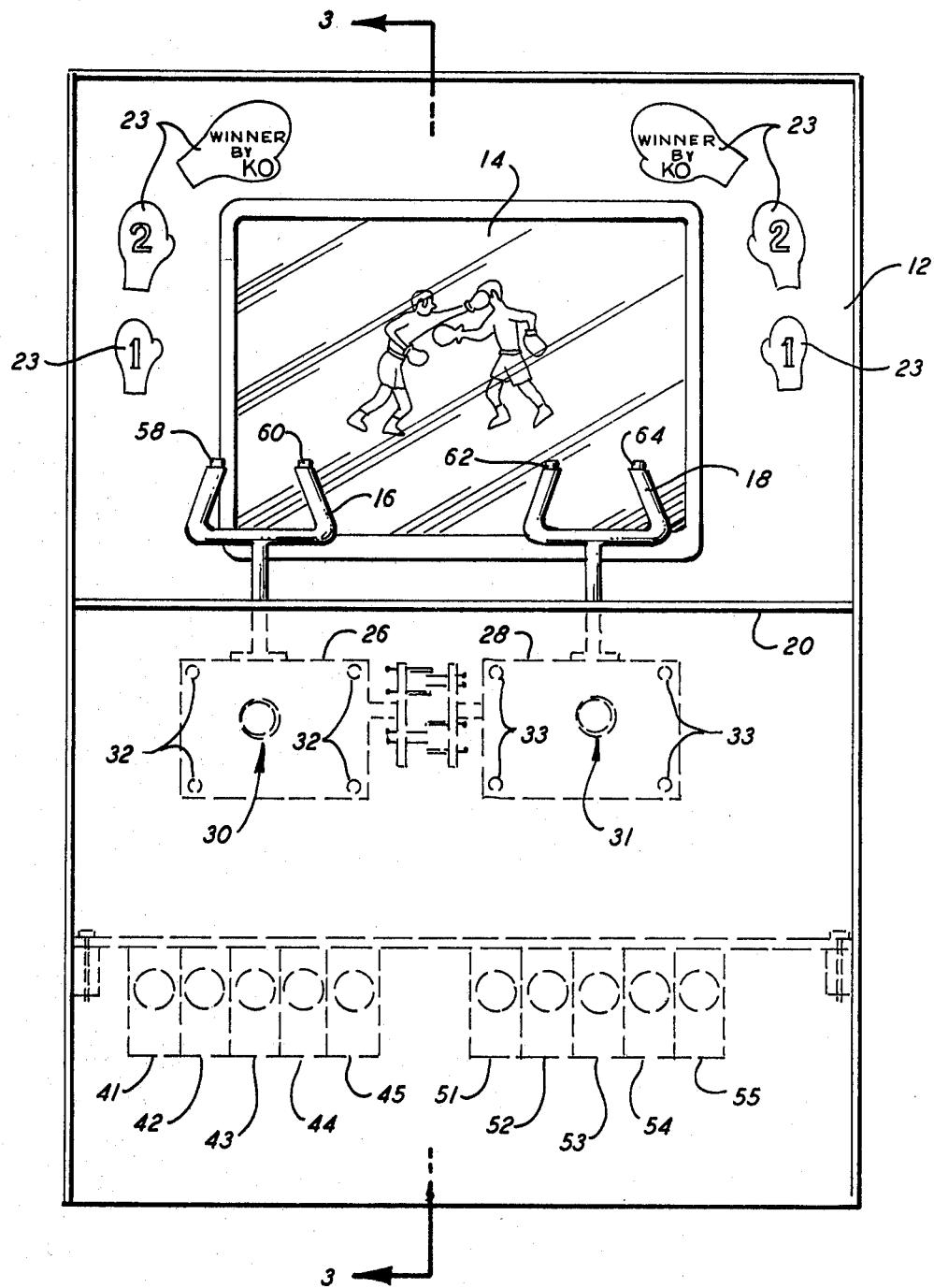
FIG. 2 is a front elevational view of the apparatus of FIG. 1 showing certain internal portions in hidden lines.
Figure 3:
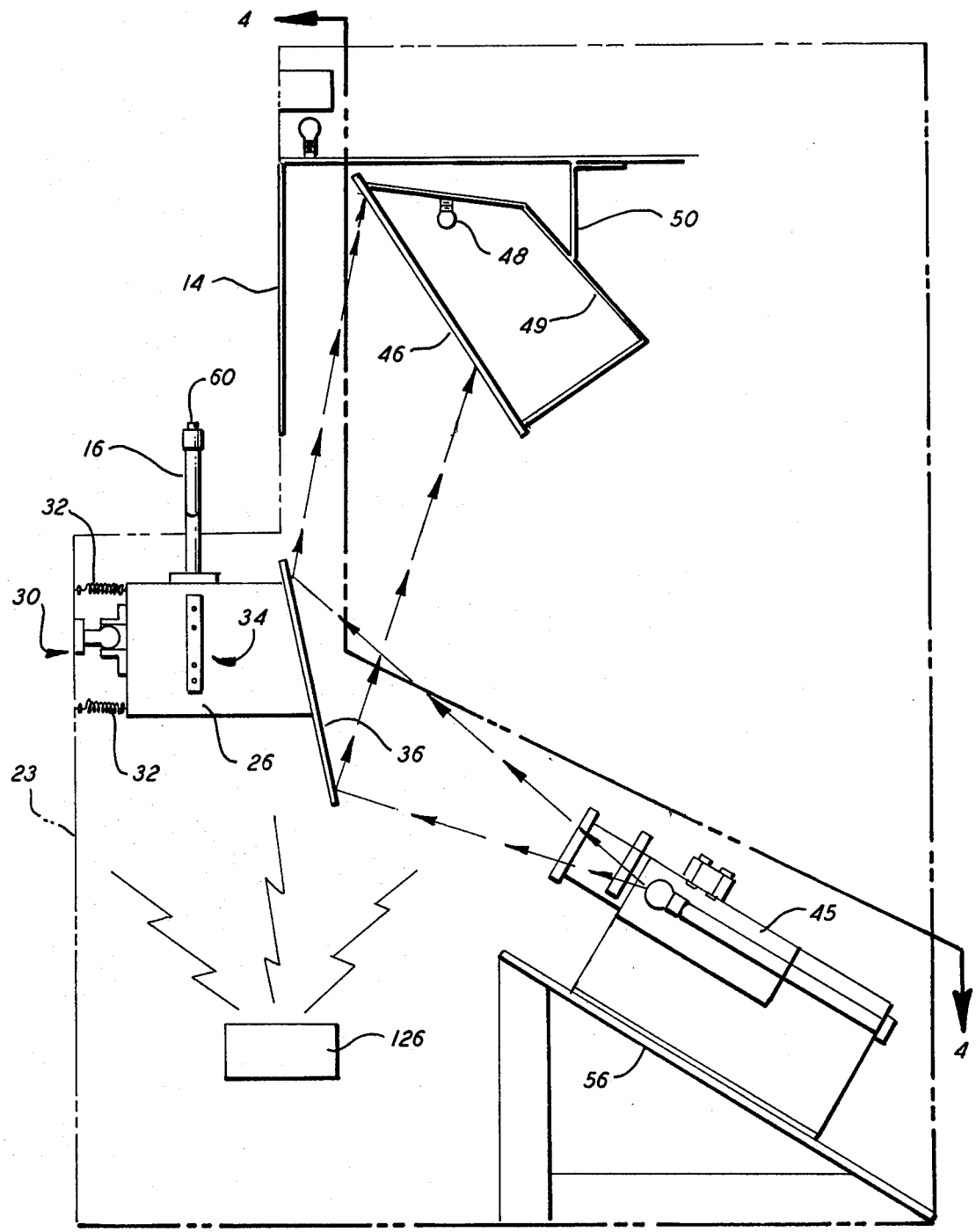
FIG. 3 is a side elevational view in section on the line 3—3 of FIG. 2.
Figure 4:
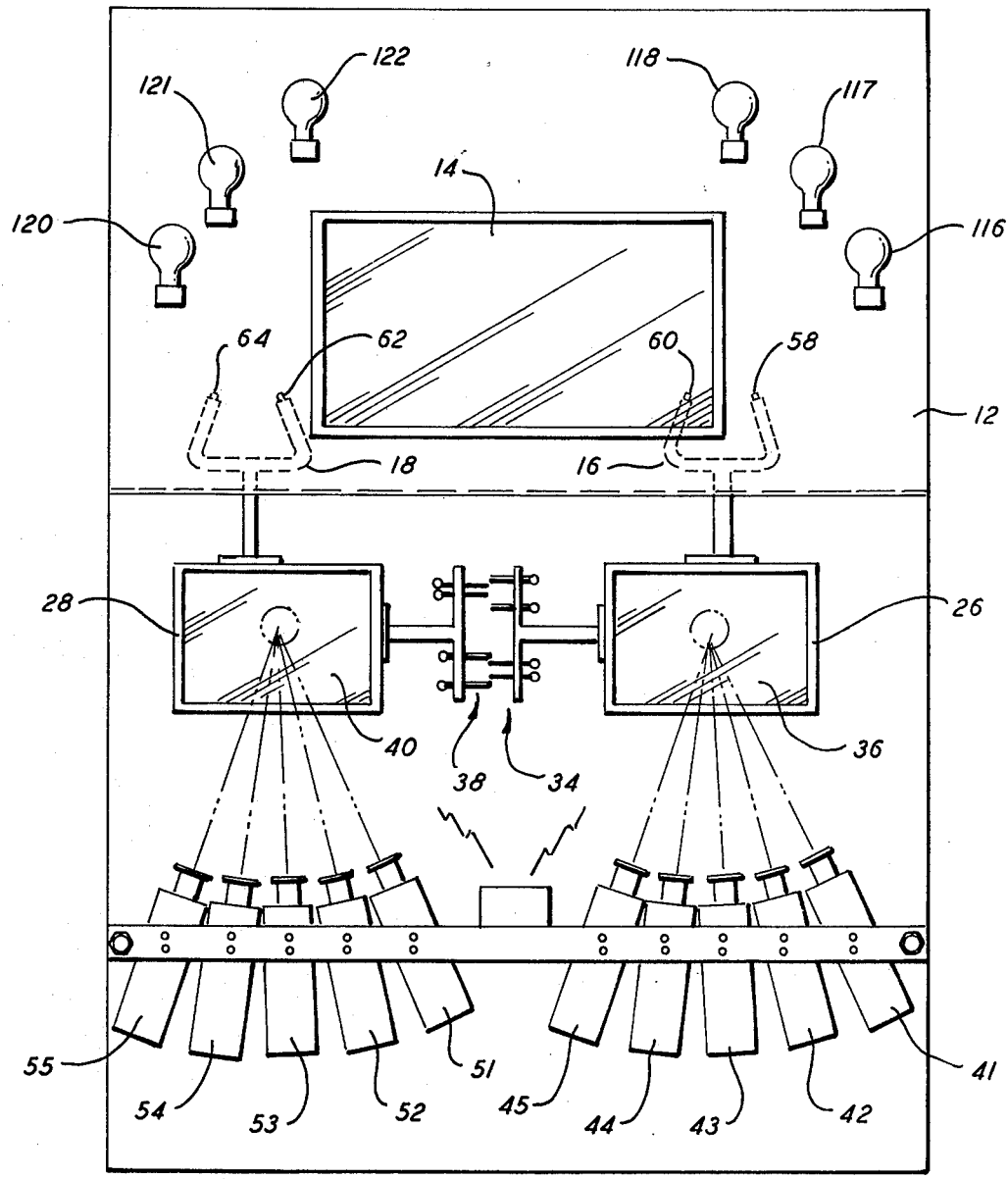
FIG. 4 is an interior, generally rear view, taken on the line 4—4 of FIG. 3.

In the form disclosed, amusement device 10 is intended for simultaneous play by two operators, one manipulating each of handles 16 and 18. As seen in FIGS. 2–4, are fixedly attached to box-like support structures 26 and 28, respectively. Each of structures 26 and 28 is supported for universal pivotal movement upon lower front wall 23. One of the connecting means in the form of a conventional ball joint 30 is seen in FIGS. 2 and 4, and a similar connection 31 (FIG. 2) is provided for support structure 28. Four biasing springs are connected between wall 23 and each of support structures 26 and 28, equally spaced about the pivotal connections thereof, to maintain the structures in a predetermined position until moved by means of handles 16 and 18. The springs associated with structures 26 and 28 are identified in FIG. 2 by reference numerals 32 and 33, respectively. Suitable stop means (not shown) are preferably provided to limit the maximum extent of movement of each of support structures 26 and 28 about their respective pivotal mountings.

Fixedly attached to support structure 26 is a set of electrical contacts, generally denoted by reference numeral 34, and fully reflecting, plane mirror 36. Likewise affixed to support structure 28 are a set of electrical contacts 38 and mirror 40. Thus, as support structures 26 and 28 are moved by manipulation of handles 16 and 18, the positions of the sets of electrical contacts 34 and 38 and of mirrors 36 and 40 are varied. The two sets of electrical contacts are so arranged with respect to the areas of movement of the support structures that certain contacts of each set are in physical engagement with contacts of the other set at predetermined positional relationships of the two support structures.

A first set of five still projectors 41–45 is supported in fixed position, with a lower, rear portion of the cabinet of amusement device 10. Each of projectors 41–45 is oriented with its beam axis directed to project an image upon mirror 36 by which it is reflected to screen or viewing surface 46. Alternatively, surface 46 may comprise a second mirror for projecting the image upon the rear surface of sheet 14. Preferably, however, sheet 14 merely provides a window through which the images projected upon viewing surface 46 are seen. For enhanced visual effect, viewing surface 46 is of translucent material and is illuminated from the side opposite that on which the image is displayed by means of bulb 48. Box-like enclosure 49 surrounds bulb 48 and the rear side of viewing surface 46 and is supported within the cabinet by bracket 50.

A second set of five projectors 51–55 are supported in side-by-side relation in the lower rear portion of the cabinet to project images upon mirror 40. The images are reflected to viewing surface 46 and seen through sheet 14 in the same manner as the images from projectors 41–45. The projectors and mirrors are so positioned, and the limits of movement of the mirrors are such that the images from the respective sets of projectors, or at least the major portions thereof, are always projected on the same lateral half of the viewing surface. Any desired visual display which remains fixed in position may be incorporated directly upon surface 46 or projected on the rear side thereof, as appropriate. Support structure 56 (FIG. 3) in the lower portion of the cabinet serves to hold all projectors of both sets in the required positions.

As best seen in FIGS. 2 and 4, each of handles 16 and 18 is equipped with two push-buttons. As handle 16 is grasped in both hands for manipulation of the position of support structure 26, buttons 58 and 60 are conveniently positioned for depression by the player's right and left thumbs, respectively. Likewise, buttons 62 and 64 are positioned for depression by the left and right thumbs, respectively, of an operator grasping the two arms of handle 18. Buttons 58 and 60 are connected to electrical switches which respectively control actuation of two of the projectors in the first set. That is, as explained later, only one projector from each set is actuated to project an image at any given time while the device is in operation. Depression of button 58 closes a switch which actuates a particular one of the five projectors 41–45, while preventing actuation of any of the other four, and depression of button 60 closes another switch actuating another one of the five projectors. Buttons 62 and 64 likewise are connected to electrical switches controlling actuation of two of the projectors of the second set. Actuation of the other three projectors of each set is controlled by circuit elements described later.

Figure 5:
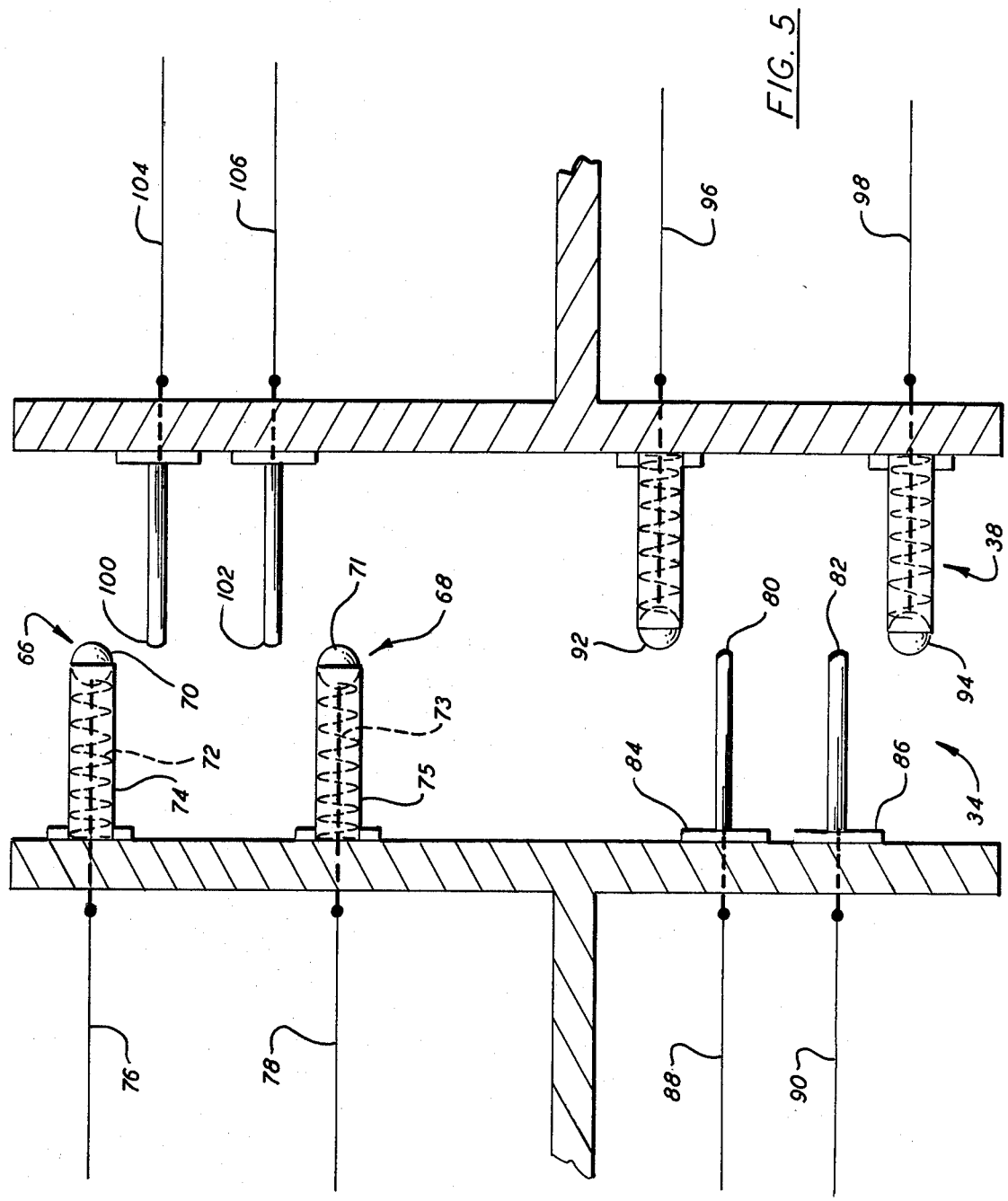
FIG. 5 is an enlarged, fragmentary, front elevational view of certain portions of the apparatus.

Turning now to FIG. 5, the two sets of electrical contacts 34 and 38, associated with support structures 26 and 28, respectively are shown in greater detail. Each set includes two pairs of contacts, one pair spaced more widely than the other. Contacts 66 and 68 of set 34 are resilient, spring loaded contacts each comprising a ball 70 of conducting material, biased by springs 72 toward an outward position with respect to hollow tubes 74. The conducting ball of contact 66 is connected to electrical lead 76, and that of contact 68 is connected to lead 78. The other pair of contacts of set 34, denoted by reference numerals 80 and 82, may also be of the resilient type, but are preferably axially adjustable. Thus, the two contacts may comprise rigid, threaded, electrically conducting members which may be advanced or retraced in threaded supports 84 and 86. Contacts 80 and 82 are connected to electrical leads 88 and 90, respectively.

The second set of contacts 38 is formed identically to the first, but oppositely positioned. Resilient contacts 92 and 94 are connected to leads 96 and 98, respectively, and rigid, adjustable contacts 100 and 102 are connected to leads 104 and 106, respectively. Although the circuitry could easily be designed to operate with only a single rigid contact in each set, the use of a pair of spaced contacts is preferred. As shown, the rigid pair of contacts of each set are the more closely spaced. Relative manipulation of handles 16 and 18 will bring contacts 82 and 94 and contacts 66 and 100, respectively, into mutual engagement. The resilient biasing of one pair of the contacts of each set avoids any substantial forces being transmitted through handles 16 and 18 so that the operators do not perceive the engagement of the contacts through manipulation of the handles.

Figure 6A:
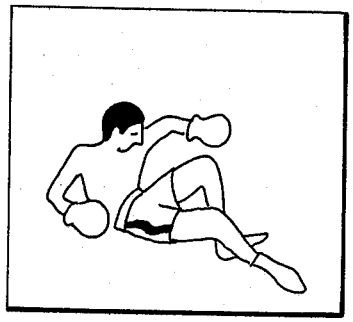
FIGS. 6A–6E show typical examples of a set of images projected by one of the two pluralities of projectors.
Figure 6B:
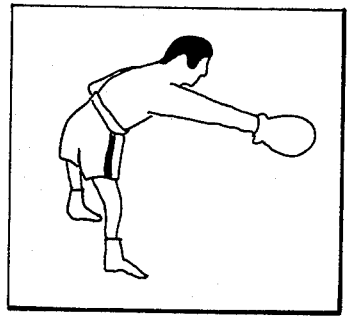
Figure 6C:
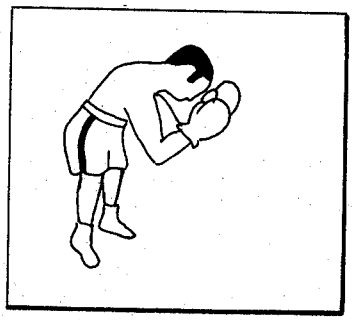
Figure 6D:
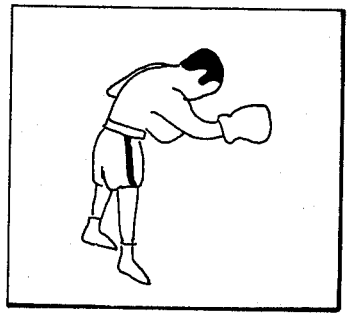
Figure 6E:
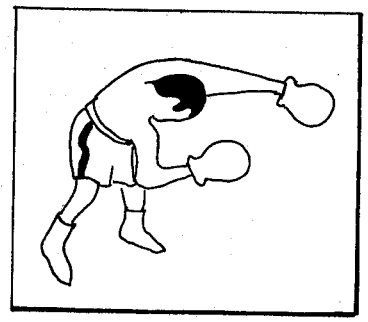

FIGS. 6A through 6E are examples of the images projected by the five projectors of the first set. In FIG. 6A the fighter is shown in the knock down position. A slide transparency bearing this image is contained in projector 41. Projector 42 contains a slide bearing an image such as that shown in FIG. 6B, with the fighter throwing a right punch. FIGS. 6C and 6D show the fighter in two defensive stances and appear on slides in projectors 43 and 44. In FIG. 6E the fighter is throwing a left punch and a slide bearing this image is contained in projector 45. Five images which are similar but reversed in direction from right-facing to left-facing are provided on slides contained in projectors 51–55.

Turning now to FIG. 7, there is shown a complete electrical schematic of device 10 from which the operation thereof may be clearly understood. The indicated circuit is, of course, subject to many modifications within the scope of the invention, several of which are specifically mentioned hereinafter. It will also be readily apparent to those skilled in the art that solid state devices, or other equivalent circuitry, may easily be substituted for the relays, stepping switches, etc., shown in the schematic.

Device 10 is connected to a standard 115v AC power source outlet by means of plug 104. One side of the line voltage is connected to a conventional coin box or acceptor, indicated generally at 106 in order to activate the unit by momentary closure of a normally open switch upon deposit of the proper coin(s). All relay contacts and other circuit elements are shown in the de-energized positions, i.e., prior to insertion of a coin and manipulation of the movable elements. Upon closure of the coin drop switch relay R-1 is energized, thereby actuating time delay relay TDR. After expiration of a predetermined time period the time delay relay will automatically de-energize and end the game unless it has already been ended by the scoring circuitry, as explained later. The other side of the line voltage is connected to one side of transformer 108 and to a common 115v AC ground, indicated by symbol 115. It will be noted that three different symbols are used to indicate the ground connections for the three different voltage levels utilized in the circuitry. A common reference numeral, corresponding to the voltage value (6, 24 and 115), is used to denote each occurrence in the drawings of the respective ground connections.

The 6v AC lead from transformer 108 is connected to rectifier 110 and, through one contact of relay R-1 to the activating coil for bell 112. Energization of relay R-1 by deposit of a coin closes both relay contacts, thereby providing power to ring bell 112, signalling the start of the bout, and to energize time delay relay TDR.

Figure 7B:
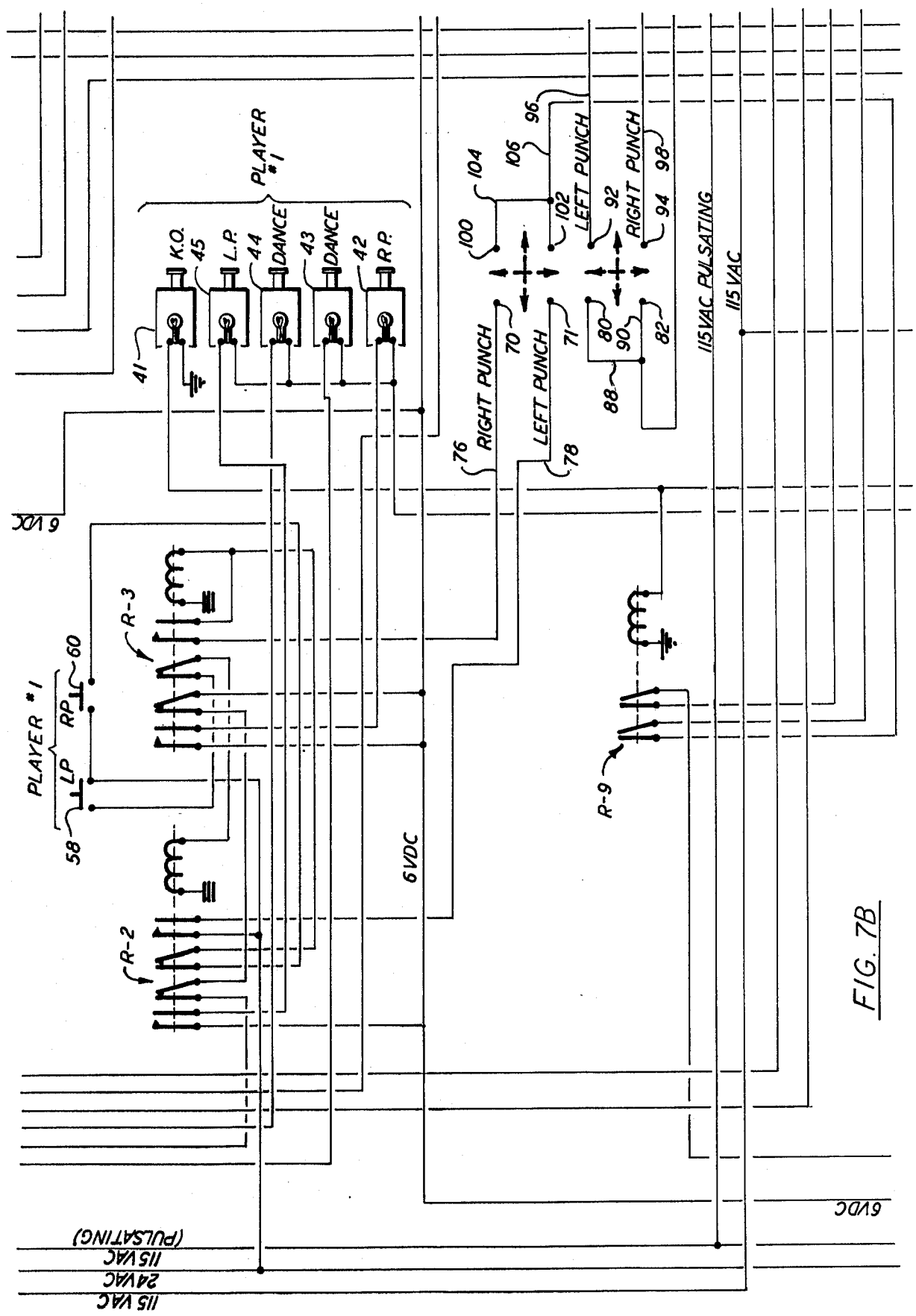
Figure 7C:
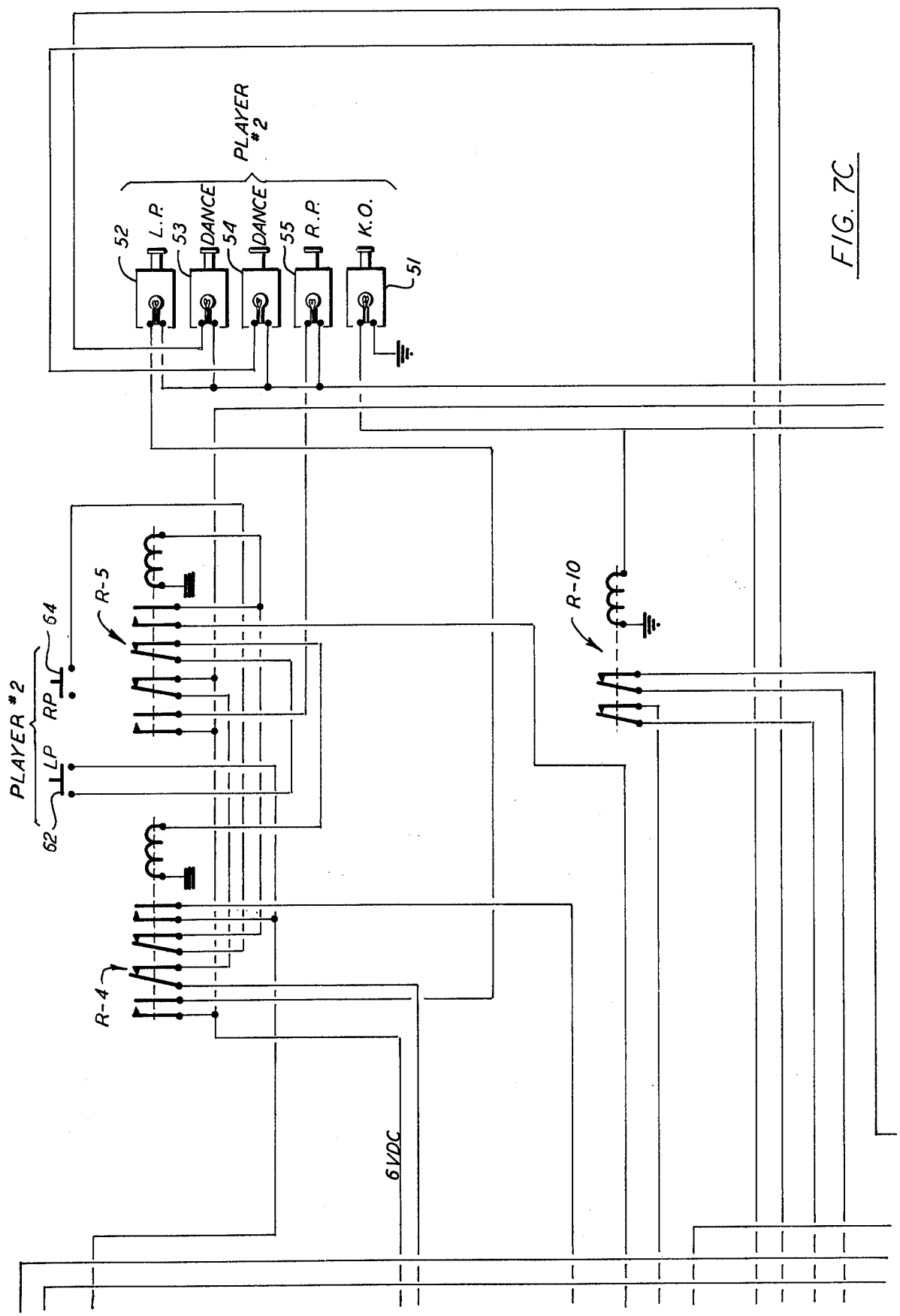
Figure 7D:
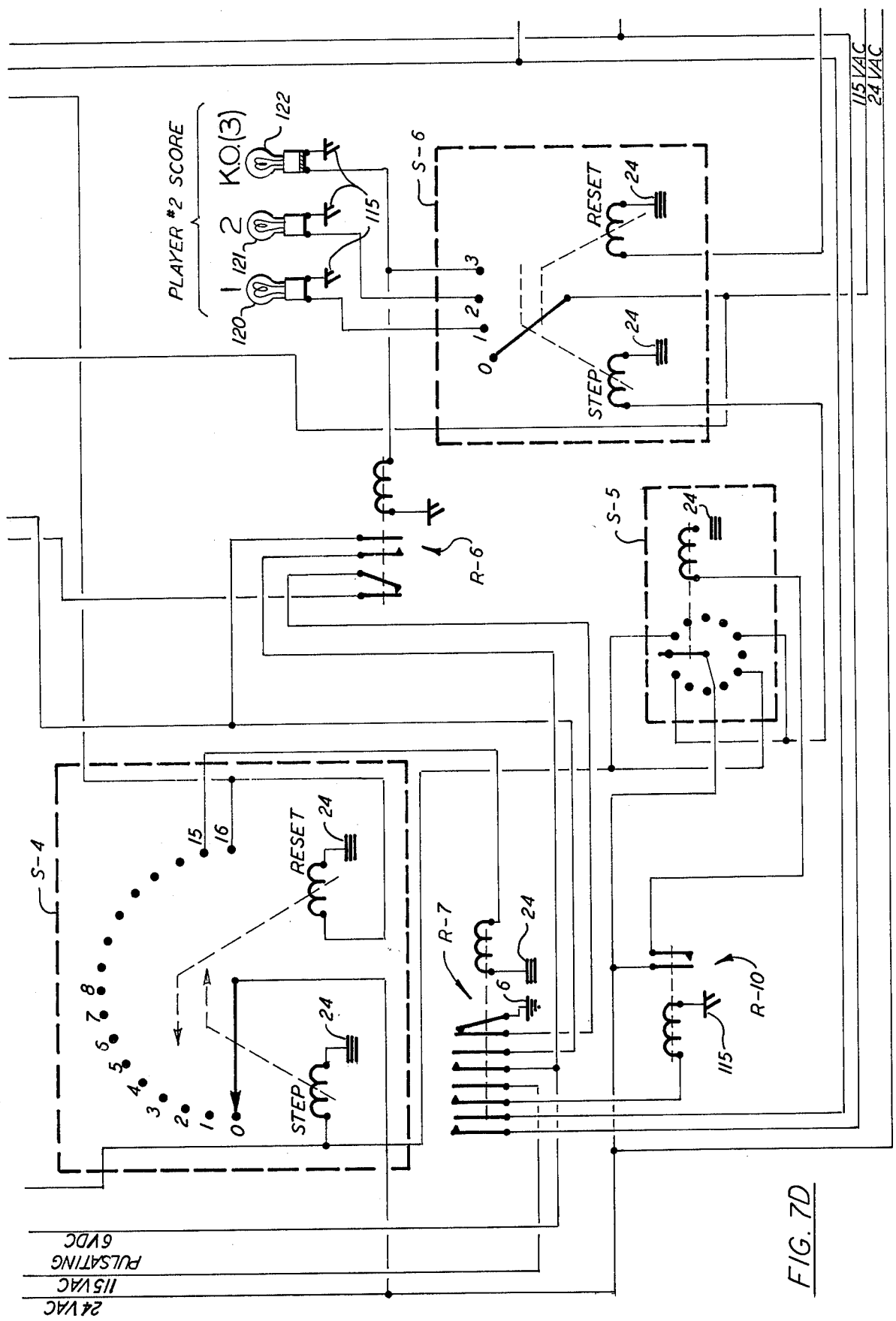
Figure 7E:
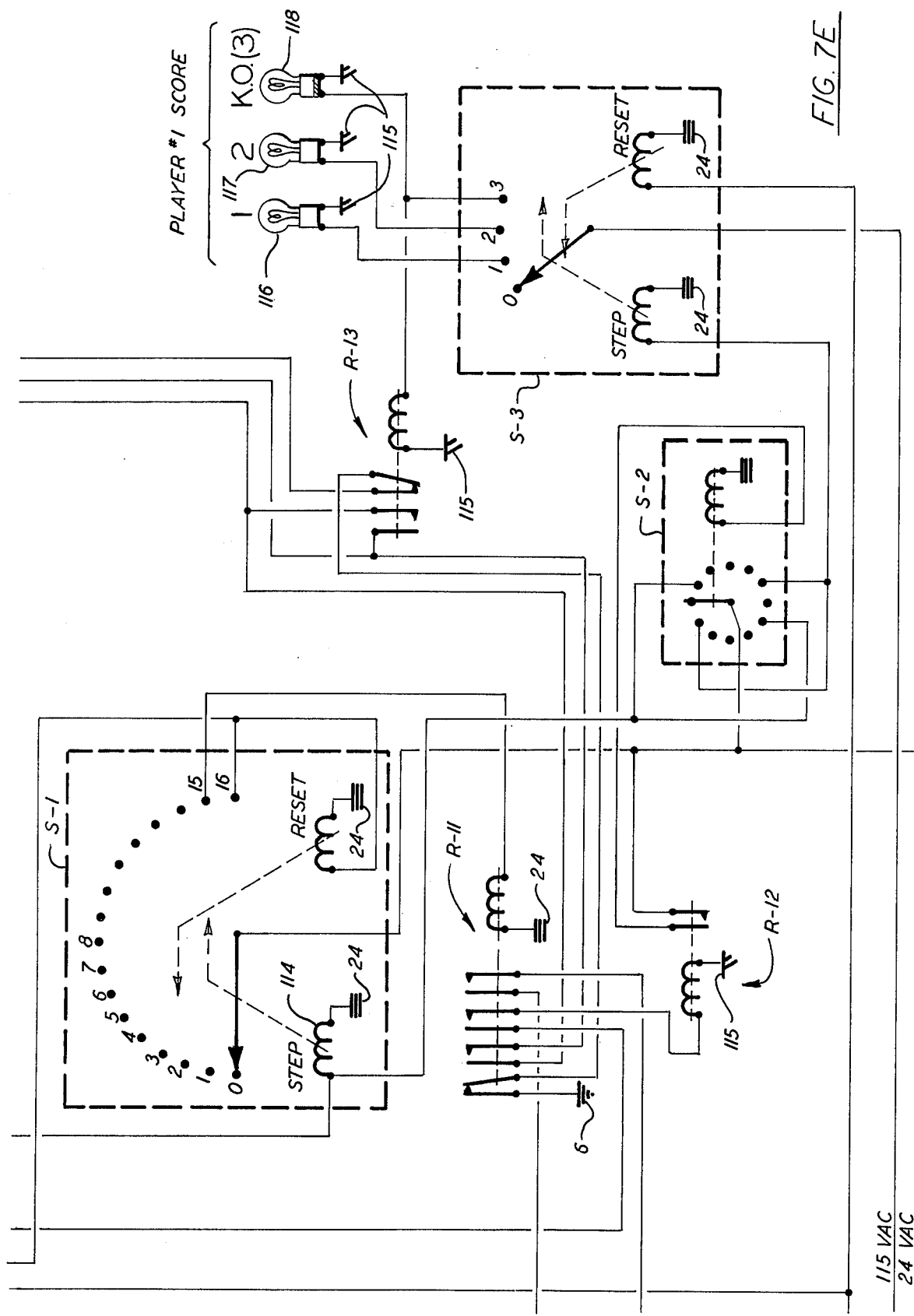

The 6v DC line from rectifier 110 is connected to playback unit 112 for a continuous loop of tape having a representative crowd noise sound recorded thereon. The same 6c DC line is also connected to certain contacts of relays R-2 and R-3 (FIG. 7B) which may be selectively energized by depression of push-buttons 58 and 60 (FIG. 2), respectively, by one player. Relays R-4 and R-5 (FIG. 7C), selectively energized by the other player by depression of push-buttons 62 and 64, respectively, are also connected to the 6v DC line. Energization of relay R-2 connects projector 45 to the 6v DC power line, thereby projecting the left punch image shown in FIG. 6E, provided the ground connection to the projector is completed through relays R-6 and R-7 (FIG. 7D). The image from projector 42 is projected in similar manner by energizing relay R-3. The common ground connection through relays R-6 and R-7 will be broken by energization of either of these relays in a manner explained hereinafter.

Projectors 43 and 44, which serve to display the images of FIGS. 6C and 6D, showing the fighter in alternate defensive positions, are also connected to the common ground through relays R-6 and R-7, and are connected to the 6v DC power line through relay R-8 and normally closed contacts of relays R-2 and R-3. Relay R-8 is alternately energized and de-energized by the pulsating nature of the 115v AC power to which it is connected through flasher 113. Thus, when neither of push-buttons 58 and 60 is depressed, the images from projectors 43 and 44 will be alternately projected in rapid succession, giving the impression of a fighter dancing in a defensive stance.

Scoring is effected through electro-mechanical stepper switches of the type commonly employed in pin-ball and similar amusement devices. The movable contacts described in connection with FIG. 5 are shown schematically in FIG. 7B. Contacts 70 and 71 are connected, through lines 76 and 78, respectively, to normally open contacts of relays R-2 and R-3. Contacts 100 and 102 are connected through lines 104 and 106 to normally closed contacts of relay R-9, and thence through normally closed contacts of relay R-10 to stepping coil 114 switch S-1. Thus, each time push-button 58 is depressed to close the associated switch while contacts 71 and 102 are in engagement, a circuit is completed from the 24v AC power line to coil 114, thereby advancing the arm of switch S-1 by one increment. The same applies when push-button 60 is depressed while contacts 70 and 100 are in mutual contact. As previously indicated, since the positions of the images from the two sets of projectors are related in the same way as contacts 70, 71, 100, and 102, each time one of the fighter images appears to land a punch on the other's head, the arm of stepper switch S-1 is advanced, indicating a hit.

After switch S-1 has advanced fifteen steps (or any other desired number), the 24v AC power line is connected through the switch arm to relay R-11, thereby closing the contacts through which projector 51 is actuated and opening the contacts to the common ground of projectors 52–55. That is, when one player's fighter has scored a total of fifteen hits, the image of the other player's fighter in the down position (FIG. 6A) is displayed, the circuits to all other projectors of the other player's fighter being disabled by breaking the ground connection.

Relay R-12 is energized through a pair of normally open contacts of relay R-11, thereby advancing stepper switch S-2, a 12-position, continuous ratchet-type stepper which automatically steps six positions upon each actuation, since its coil is connected to 24v AC power through relay R-12 which is energized by pulsating 115v AC through flasher 113. It stops after six steps because it serves to reset switch S-1, whereupon relay R-11 is de-energized, disconnecting relay R-12 from the pulsating power source. This allows the image of the fighter in the down position to be displayed for several seconds before again actuating switch S-1 to move to the next position, thereby resetting to the zero position. Energization of relay R-11, in addition to actuating projector 51, also energizes relay R-10, thereby opening the contacts through which the circuit to scoring switch S-1 is completed. Thus, while a fighter image in the down position is being displayed, further scoring cannot take place. Relays R-11 and R-10 are both de-energized when switch S-1 is reset, whereby scoring may resume.

A third stepper switch S-3 controls the three score lights 116, 117 and 118. Switch S-3 is advanced at two positions of switch S-2 intermediate of the two positions thereof which serve to reset switch S-1. Thus, after switch S-1 has been indexed fifteen times from its original zero position, S-2 is actuated to produce a one-step advance of switch S-3, thereby turning on light 116. After switch S-1 has reset and indexed an additional fifteen times, switches S-2 and S-3 are again indexed, turning on light 117 and indicating that the first player has scored two knock-downs. The third indexing of switch S-3, in addition to turning on light 118, energizes relay R-13. This serves to hold projector 51 on, and projectors 52-55 off or disabled, thereby signaling the end of the match. Since relay R-10 is energized when projector 51 is actuated, further scoring is prevented.

It will be noted that stepper switches S-1, S-2 and S-3, associated with the scoring circuitry for the first player, are duplicated in corresponding switches S-4, S-5 and S-6, respectively, for the other player. Likewise, score lights 120, 121 and 122 correspond to lights 116, 117 and 118, respectively. Relay R-14 serves to reset all of stepper switches S-1, S-3, S-4 and S-6 upon insertion of a coin to start a new game. Lines 124 provide an audio by-pass circuit to increase the volume of the crowd noise through speaker 126 each time either of switches S-1 and S-4 reach the fifteenth position, i.e., upon each knock down.

In the event neither player has scored three knock downs at the expiration of the preset time period, the game will be disabled by switching of the contacts of time delay relay TDR. As shown in FIG. 7A, a "game over" light is illuminated through the contacts of TDR upon expiration of the time period. If desired, additional circuitry could be provided to illuminate this light upon the scoring of three knock downs, as well as upon expiration of the time period.

Many other modifications are readily apparent. For example, the circuitry could provide for scoring only when neither fighter is in a defensive position, or when the fighter scored upon is in only one of the two indicated defensive positions, thereby making timing of the punches more exacting. Also, with minor circuit modifications, the game could require that a particular punch (either right or left) be used as the final punch required to score a knock down.

Although the game has been disclosed in the context of two opposing players, each selecting the particular image displayed and manipulating its position on the viewing surface, provision could be made for randomly varying one of the images and its position for competition by a single player. The scenario of the game may be selected from any situation wherein scoring is dependent upon both the selection of particular images from among a discrete plurality thereof and the selective positioning of the image upon a viewing surface. Although a boxing match provides a familiar and convenient example of such a situation, many other options are obviously available, some of which may involve more than two players.

What is claimed is:

1. An animated game involving player manipulation of visually displayed images comprising:
   (a) a viewing surface;
   (b) first and second optical projector means;
   (c) first and second pluralities of discrete images adapted for optical projection on said viewing surface by said first and second projector means, respectively;
   (d) first and second projection control means each effective to cause projection of any of the images from among said first and second pluralities, respectively, at least some of said projection control means being selectively controlled by a player;
   (e) first and second image position control means each effective to vary the position on said viewing surface of the image displayed thereon from said first and second pluralities, respectively, at least one of said position control means being selectively controlled by a player; and
   (f) scoring means effective to register a score in response to simultaneous player control of said projection control means and said position control means to cause projection of a particular image from one of said pluralities positioned in predetermined relation to the image projection from the other of said pluralities.

2. The invention according to claim 1 wherein said images are carried upon transparent slides.

3. The invention according to claim 2 wherein said first and second projector means comprise individual slide projectors each adapted to project an image from a single one of said slides, whereby the number of slides and projectors are equal in each of said first and second pluralities.

4. The invention according to claim 1 wherein at least said one position control means includes a manually engageable member selectively movable by a player to vary the position of the image from one of said pluralities upon said viewing surface.

5. The invention according to claim 4 and further including first and second mirrors by which the images projected by said first and second projection means, respectively, are reflected to said viewing surface, and connecting means by which said manually engageable member is connected to one of said mirrors to effect movement thereof, thereby varying the position upon said viewing surface of the image reflected thereby.

6. The invention according to claim 5 wherein said projection control means includes manually engageable switch means movable between at least two positions to change the image projected on said viewing surface.

7. The invention according to claim 6 wherein said switch means is positioned upon said manually engageable member, whereby a player may simultaneously manipulate both said switch means and said member.

8. The invention according to claim 7 wherein said manually engageable member is constructed and arranged to be grasped simultaneously by both hands of a player, and said switch means includes right and left portions which are physically spaced upon said element for manipulation by the right and left hands, respectively, of the player.

9. An adversary game for at least two opposing players involving manual control by both players of optically projected images, comprising:

(a) a viewing surface;
(b) a first plurality of still projectors, each having on and off positions and constructed and arranged to project an image upon said surface only when in the on position;
(c) a second plurality of still projectors, each having on and off positions and constructed and arranged to project an image upon said surface only when in the on position;
(d) a first control member selectively movable to vary the position on said viewing surface of an image projected by any of said first plurality of projectors;
(e) a second control member selectively movable to vary the position on said viewing surface of an image projected by any of said second plurality of projectors;
(f) first switch means selectively movable between a plurality of positions each of which is effective to place one of said first plurality of projectors in its on position;
(g) second switch means selectively movable between a plurality of positions each of which is effective to place one of said second plurality of projectors in its on position; and
(h) scoring means effective to register a score for each player in response to simultaneous manipulation by the respective players of said control members and switch means in predetermined relation to one another.

10. The invention according to claim 9 wherein said first and second switch means comprise manually engageable members positioned on said first and second control members, respectively.

11. The invention according to claim 10 wherein each of said first and second switch means includes left and right portions which are physically spaced upon said control member for manipulation by the right and left hands, respectively, of an operator.

12. The invention according to claim 9 and further including first and second mirrors arranged to reflect images from said first and second plurality of projectors, respectively, to said viewing surface, and means for manually manipulating said first and second mirrors separately to vary the positions of images reflected thereby on said surface.

* * * * *